United States Patent Office 2,974,053

Patented Mar. 7, 1961

2,974,053

LIGHT-STABLE BISMUTH OXYCHLORIDE NACREOUS PIGMENT AND METHOD OF PREPARING SAME

Lawrence Suchow, Yonkers, N.Y., assignor to Francis Earle Laboratories, Inc., Peekskill, N.Y., a corporation of New York No Drawing. Filed Feb. 7, 1958, Ser. No. 713,791

12 Claims. (Cl. 106—187)

This invention relates to nacreous pigments of light-stabilized bismuth oxychloride. Substances which have a high index of refraction and are in the form of thin, plate-like crystals are commonly used to produce a nacreous, mother-of-pearl effect. The optical effect can be achieved either by coating the surface of an object with a vehicle containing such crystals or by incorporating the crystals within light-transmitting substances, such as plastics, in which case the optical effect becomes an integral part of the object.

To produce pearly luster in surface coating, nacreous pigments are suspended in a light-transmitting, film-forming vehicle which is applied to a surface so that the thin, plate-like crystals of the pigment lie parallel to one another and generally perpendicular to incident light. The nacre is caused by simultaneous reflection of light from the many parallel surfaces at different depths, which produces a velvety pearl-like luster rather than the metallic mirror-like luster characteristic of light reflected from a single surface.

Integral mother-of-pearl effects can be produced with many transparent or translucent substances by incorporation of the nacerous material within the substance itself. For example, simulated mother-of-pearl knife handles and fountain pen barrels can be made by incorporating a nacreous pigment in a plastic, such as cellulose acetate, which is then molded into the appropriate shape. Simulated pearl buttons are made from discs which are cut from acrylic or polyester sheets containing oriented pearly pigment; the nacreous pigment is suspended in the appropriate polymerizable resin, which is then cast to form a solid sheet in which the nacreous effect is incorporated. It is important in this application that the plate-like crystals have the proper orientation at the time of gelation.

To obtain pearly luster, the index of refraction of the crystal should differ from that of the medium by as wide a margin as possible. Generally, a suitable nacreous effect begins to appear when the index of refraction of the medium and that of the crystal differ by approximately 0.2 and improves as the difference increases.

Pearl essence, a composition in which the nacreous material consists of the guanine crystals derived from fish scales, is a very effective nacreous pigment, but at the same time is a relatively expensive product. Lead hydrogen phosphate, lead hydrogen arsenate, and several other inorganic compounds may also be prepared in nacreous form, but these compounds generally have relatively low thermal decomposition temperatures and in addition are limited in their application to uses in which the presence of lead compounds is unobjectionable. For example, the synthetic nacreous compositions have heretofore not been available for certain cosmetic uses wherein the presence of lead compounds should be avoided.

One of the difficulties encountered in the use of certain synthetic nacreous compositions is that some of them have a tendency to darken or discolor upon exposure to light.

It has been known that bismuth oxychloride occurs in the form of plate-like crystals, of a type encountered in nacreous pigment compositions. Bismuth oxychloride, however, tends to darken upon exposure to ultraviolet light. The darkening is probably due to photo-reduction of the $Bi^{3+}$ cation to a lower valence state, perhaps even to metallic bismuth. It has previously been proposed to make certain bismuth salts insensitive to light by incorporating therewith, in plastic masses, compounds containing the quinone group, such as anthraquinone. Such compounds prevent the reduction to metallic bismuth by being themselves preferentially reduced through the action of light and, when completely reduced, offer no further protection.

Moreover, such compounds have not been adequate in protecting the bismuth oxychloride from light in the ultraviolet range.

Accordingly, it is an object of the present invention to provide a nacreous pigment containing light-stable bismuth oxychloride as the nacre-producing substance therein.

It is another object of the present invention to provide a method for preparing such a nacreous pigment.

These and other objects will be apparent from the description which follows:

In accordance with the present invention, there is provided a nacreous composition including a light-transmitting vehicle having, as the nacre-producing pigment therein, flat, plate-like crystals of bismuth oxychloride, the compositions being made stable to ultraviolet light by the inclusion therein of an effective amount of a 2-hydroxy benzophenone derivative. Such benzophenone compounds are preferably from the group consisting of 2-hydroxy-4-methoxy benzophenone; 2,4-dihydroxy benzophenone, 2,2'-dihydroxy-4,4'-dimethoxy benzophenone, dibenzoyl resorcinol, and 5-chloro-2-hydroxy benzophenone. These compounds, in contradistinction to the quinone-type light-stabilizing compounds of the prior art, are not chemically latered upon exposure, and, therefore, remain effective indefinitely. The weight ratio of the benzophenone light-stabilizer to the bismuth oxychloride nacreous pigment is in the range of about 2–75:100.

Generally, the bismuth oxychloride nacreous pigment will be protected from ultraviolet light below about 3650 A., although this figure may vary somewhat depending upon the concentration and absorption spectrum of the specific benzophenone derivative used. Since this pigment is not affected by visible light, no problem arises in protecting it from the higher wave lengths.

The pigment of the present invention is prepared through the hydrolysis of an acid bismuth chloride solution at temperatures between about 15° C. and 100° C. The $BiCl_3$ solution (which may be formed as a soluble complex by dissolving $Bi_2O_3$ in a hydrochloric acid solution) is diluted with water and agitated until the crystalline bismuth oxychloride precipitates. The BiOCl crystals are then separated from the mother liquor by filtration or settling, washed and placed in a water-miscible organic solvent so as to form a pasty crystalline suspension. To this suspension, there is then added the benzophenone light-stabilizing compound.

Crystal plates giving best results are in the size range of from 2 to 100 microns. This dimension is the diameter as measured in the plane of the flat, plate-like crystal. This thickness of such crystals would be of the order of about 0.1 to 1 micron.

It is further desired that the ratio of diameter to thickness be at least 4. Thus, particles of 2 microns in diameter are suitable if they are 0.5 micron or less in thickness. Platelets 1 micron thick should be at least 4 microns in diameter. Although particle size of 2 to 100 microns diameter produce optimum luster, platelets which are as small as 0.5 micron in diameter are suitable if the crystals are sufficiently thin.

By combining the bismuth oxychloride pigment with the light-stabilizing benzophenone compound in a weight ratio of 2–75:100, it is found that exposure of the nacreous pigment to light, even in the ultraviolet range, does not cause any recognizable discoloration.

For surface coating, the nacreous pigments of the present invention can be suspended in a cellulose nitrate lacquer. However, there may be substituted almost any clear laquer formula as the vehicle for the bismuth oxychloride pigment. Generally, a translucent or transparent plastic material such as cellulose acetate, alkyd resins, the vinyl resins, as well as the acrylic acid ester resins are found to be quite useful. A typical paste composition useful for stock material to be diluted to a useful concentration level is the following:

| | Percent |
|---|---|
| Nacreous BiOCl | 25.0 |
| Cellulose nitrate lacquer | 75.0 |

The lacquer may have a formulation like the following:

| | Percent |
|---|---|
| Cellulose nitrate (15–20 seconds) | 8 |
| Ethanol | 3–20 |
| Amyl acetate | 89–72 |

The water washed crystals which have been described above can be made compatible with a lacquer of this type by being washed with a suitable water-miscible organic solvent, such as ethanol.

The solvent, instead of containing primarily amyl acetate as indicated in the above example, may comprise butyl acetate, acetone, or other commonly used organic solvents.

For incorporation in a plastic, such as poly (methyl methacrylate), it is convenient to disperse the nacreous crystals in a plasticizer rather than in a lacquer formulation. A suitable composition for this purpose is:

| | Percent |
|---|---|
| Nacreous BiOCl | 25.0 |
| Acetone | 20.0 |
| Dibutyl phthalate | 55.0 |

The pigment paste is blended with a plastic molding powder, such as poly (methyl methacrylate), in such quantity as to yield a final concentration in the plastic of approximately 0.5 percent nacreous pigment. The plastic can be extruded into rods, injection molded into various shapes, etc.

The following examples illustrate specifically various methods for preparing the light stabilized bismuth oxychloride nacreous pigments.

*Example I*

A $BiCl_3$ solution is prepared by dissolving 3.89 grams of $Bi_2O_3$ in a solution made from 21 ml. 12.1 N HCl and 50.5 ml. water. The solution is then added rapidly to 600 ml. of distilled water at room temperature, e.g. 25° C. The mixture is agitated with mechanical stirring at moderate speed. Stirring is continued for ten minutes. The mixture is then cooled to room temperature by addition of ice and the BiOCl pigment is separated by filtration, washed with water, the water then being displaced by ethanol.

The pigment is then combined with 2-hydroxy-4-methoxy benzophenone so that the weight ratio of pigment to benzophenone is 4:1. Upon exposure to sunlight for three days it was found that discoloration of the bismuth oxychloride nacreous pigment was completely prevented.

Since the benzophenone compound will be soluble in most of the vehicles or media into which the bismuth oxychloride will be incorporated, it may also be added to the final nacreous paste.

The final plastic or other vehicle incorporating the pigment will generally contain from 0.1 to 0.5 percent of the benzophenone compound. Concentrations as low as .005 percent were also found to be effective in providing partial protection from the action of ultraviolet light and in many cases a concentration of as low as .01 percent would give full protection.

The hydrolysis described above may be performed with a $BiCl_3$ solution prepared from metallic bismuth, bismuth nitrate, or from any other suitable source of bismuth cation. For example, an acid solution of bismuth nitrate may be reacted with an aqueous solution containing chloride ions, e.g. NaCl to form the desired pigment. Moreover, since the light stabilizers are soluble in organic solvents, it is to be understood that they may be added to the paste, plastic mass, or film-forming vehicle.

*Example II*

The BiOCl pigment prepared as in Example I having a weight ratio of pigment to 2-hydroxy-4-methoxy benzophenone of 4:1 was incorporated in methyl methacrylate monomer in an amount of 0.26 percent, by weight. The monomer was then polymerized by conventional methods into nacreous sheets of poly (methyl methacrylate). Upon exposure to direct sunlight for two days, no discoloration of the BiOCl nacreous pigment could be observed.

*Example III*

Repeating the procedures of Examples I and II, effective light stabilization was obtained by adding to the bismuth oxychloride 2,4-dihydroxy benzophenone, dibenzoyl resorcinol or 5-chloro-2-hydroxy benzophenone, the ratio of BiOCl pigment to benzophenone compound being 5:1.

*Example IV*

The procedure of Example III was followed, except that the light-stabilizing compound was 2,2′-dihydroxy-4,4′-dimethoxy benzophenone.

In the foregoing, this invention was described only in connection with preferred embodiments thereof. Many variations and modifications of the principles of this invention within the scope of the description herein are obvious. Accordingly, it is preferred to be bound not by the specific disclosure herein, but only by the appending claims.

I claim:

1. A nacreous composition consisting essentially of a paste of a light-transmitting, film-forming vehicle having, as a nacre-producing pigment therein flat, plate-like crystals of bismuth oxychloride, said crystals having a thickness not greater than 1 micron and a diameter to thickness ratio of at least four, said composition being made stable to ultraviolet light by the inclusion therein of at least 0.005 percent of a 2-hydroxy benzophenone light-stabilizing compound, the weight ratio of said compound to the said bismuth oxychloride nacreous pigment being in the range of about 2–75:100.

2. A nacreous composition consisting essentially of a paste of a light-transmitting, film-forming vehicle having as a nacre-producing pigment therein, flat, plate-like crystals of bismuth oxychloride, said crystals having a thickness not greater than 1 micron and a diameter to thickness ratio of at least four, said composition being made stable to ultraviolet light by the inclusion therein of at least 0.005 percent of a compound from the group consisting of 2-hydroxy-4-methoxy benzophenone, 2,4-dihydroxy benzophenone, 2,2′-dihydroxy-4,4′-dimethoxy benzophenone, dibenzoyl resorcinol, and 5-chloro-2-hydroxy benzophenone, the weight ratio of said compound to the said bismuth oxychloride nacreous pigment being in the range of about 2–75:100.

3. The composition of claim 2 in which the light-stabilizing compound is 2-hydroxy-4-methoxy benzophenone.

4. The composition of claim 2 in which the light-stabilizing compound is 2,4-dihydroxy benzophenone.

5. The composition of claim 2 in whigh the light-stabilizing compound is 2,2′-dihydroxy-4,4′-dimethoxy benzophenone.

6. The composition of claim 2 in which the light-stabilizating compound is dibenzoyl resorcinol.

7. The composition of claim 2 in which the light-stabilizing compond is 5-chloro-2-hydroxy benzophenone.

8. A nacreous composition consisting essentially of a light-transmitting plastic supporting medium having, as a nacre-producing substance therein flat, plate-like crystals of bismuth oxychloride, said crystals having a thickness not greater than 1 micron and a diameter to thickness ratio of at least four, said composition being made stabie to ultraviolet light by the inclusion therein of at least 0.005 percent of a 2-hydroxy benzophenone light-stabilizing compound, the weight ratio of said compound to the said bismuth oxychloride nacreous pigment being in the range of about 2–75:100.

9. The composition of claim 8 in which the plastic supporting medium is from the group consisting of polyester and poly (methyl methacrelate) plastics.

10. The method for preparing a light-stable nacreous bismuth oxychloride composition which comprises hydrolyzing an acid solution of bismuth chloride between about 15° C. and 100° C., agitating said solution until crystalline bismuth oxychloride precipitates, said crystals having a thickness not greater than 1 micron and a diameter to thickness ratio of at least four, separating the crystals from the water and placing the same in contact with a water-miscible organic solvent in which the bismuth oxychloride is suspended and which is compatible with a vehicle or suspending medium for said composition so as to form a pastay crystalline suspension, then adding to said suspension a 2-hydroxy benzophenone compound, the weight ratio of said compound to the said bismuth oxychloride nacreous pigment being in the range of about 2–75:100.

11. The method of preparing a light-stable nacreous bismuth oxychloride composition which comprises reacting $Bi_2O_3$ with hydrochloric acid and thereby forming an aqueous solution of $BiCl_3$, hydrolyzing said solution between about 15° C. and 100° C., agitating said solution until crystalline bismuth oxychloride precipitates, said crystals having a thickness not greater than 1 micron and a diameter to thickness ratio of at least four, separating the crystals from the water and placing the same in contact with a water-miscible organic solvent in which the bismuth oxychloride is suspended and which is compatible with a vehicle or suspending medium for said composition so as to form a pasty crystalline suspension, then adding to said suspension a 2-hydroxy benzophenone compound, the weight ratio of said compound to the said bismuth oxychloride nacreous pigment being in the range of about 2–75:100.

12. The method of preparing a light-sensitive nacreous bismuth oxychloride pigment which comprises reacting an acid solution of bismuth nitrate with an aqeous solution containing chloride ions, between about 15° C. and 100° C., agitating said solution until crystalline bismuth oxychloride precipitates, said crystals having a thickness not greater than 1 micron and a diameter to thickness ratio of at least four, separating the crystals from the water and placing the same in contact with a water-miscible organic solvent in which the bismuth of oxychloride is suspended and which is compatible with a vehicle or suspending medium for said composition so as to form a pasty crystalline suspension, then adding to said suspension a 2-hydroxy benzophenone compound, the weight ratio of said compound to the said bismuth oxychloride nacreous pigment being in the range of about 2–75:100.

References Cited in the file of this patent

UNITED STATES PATENTS

| | | |
|---|---|---|
| 2,363,570 | Caprio | Nov. 28, 1944 |
| 2,568,894 | Mackey | Sept. 25, 1951 |
| 2,686,812 | Wynn et al. | Aug. 17, 1954 |
| 2,693,492 | Hoch | Nov. 2, 1954 |
| 2,853,521 | Hardy et al. | Sept. 23, 1958 |

OTHER REFERENCES

Mellor: "A Comprehensive Treatise on Inorganic and Theoretical Chemistry" (1922), vol. 9, page 679.